US012583540B2

(12) United States Patent
Claesson et al.

(10) Patent No.: US 12,583,540 B2
(45) Date of Patent: **\*Mar. 24, 2026**

(54) METHOD FOR CONTROLLING ASSEMBLY OF A VEHICLE FROM A SET OF MODULES, A CONTROL DEVICE, A SYSTEM, A VEHICLE, A COMPUTER PROGRAM AND A COMPUTER-READABLE MEDIUM

(71) Applicant: Scania CV AB, Södertälje (SE)

(72) Inventors: André Claesson, Tullinge (SE); Robert Sjödin, Nyköping (SE); Linus Ährlig, Västerhaninge (SE); Michael Bedell, Linköping (SE); Erik Lock Andersson, Stockholm (SE); Henrik Henriksson, Stockholm (SE); Sami Teppola, Nykvarn (SE); Mikko Kallio, Hölö (SE); Tomas Skeppström, Södertälje (SE); Morgan Colling, Hölö (SE)

(73) Assignee: Scania CV AB, Södertälje (SE)

( \* ) Notice: Subject to any disclaimer, the term of this patent is extended or adjusted under 35 U.S.C. 154(b) by 1120 days.

This patent is subject to a terminal disclaimer.

(21) Appl. No.: 16/976,508

(22) PCT Filed: Feb. 26, 2019

(86) PCT No.: PCT/SE2019/050168
§ 371 (c)(1),
(2) Date: Aug. 28, 2020

(87) PCT Pub. No.: WO2019/172820
PCT Pub. Date: Sep. 12, 2019

(65) Prior Publication Data
US 2021/0001940 A1      Jan. 7, 2021

(30) Foreign Application Priority Data
Mar. 6, 2018    (SE) .................................... 1850239-3

(51) Int. Cl.
*B62D 63/02* (2006.01)
*B62D 63/04* (2006.01)

(52) U.S. Cl.
CPC ........... *B62D 63/025* (2013.01); *B62D 63/04* (2013.01)

(58) Field of Classification Search
CPC ...... B62D 63/025; B62D 63/04; B62D 61/00; B62D 59/00; B62D 63/06
See application file for complete search history.

(56) References Cited

U.S. PATENT DOCUMENTS 7,849,945 B2 \* 12/2010 Ross, VII ............ B60K 7/0007
180/197
8,540,272 B1     9/2013 Vitale et al.
(Continued)

FOREIGN PATENT DOCUMENTS

CN      103387008 A    11/2013
CN      103481945 A    1/2014
(Continued)

OTHER PUBLICATIONS

Scania CV AB, International Application No. PCT/SE2019/050168, International Search Report, Apr. 29, 2019.
(Continued)

*Primary Examiner* — Justin S Lee
(74) *Attorney, Agent, or Firm* — Moore & Van Allen PLLC; W. Kevin Ransom

(57) ABSTRACT

The invention relates to a method performed by a first control device for controlling assembly of a vehicle from a set of modules, the set of modules comprising: at least one drive module and at least one functional module, wherein the at least one drive module comprises a pair of wheels and is configured to be autonomously operated, and wherein each module in the set of modules comprises at least one
(Continued)

interface releasably connectable to a corresponding interface on the other module, the method comprising: commanding a second control device of the at least one drive module to physically connect the at least one drive module with the at least one functional module to assemble a vehicle; and receiving, from at least one of the modules of the assembled vehicle, a verification of the connection between the modules.

13 Claims, 7 Drawing Sheets

(56) References Cited

U.S. PATENT DOCUMENTS

| | | | |
|---|---|---|---|
| 8,684,115 B2 | 4/2014 | Bryant | |
| 9,302,723 B1 | 4/2016 | Pollitzer et al. | |
| 9,352,745 B1 | 5/2016 | Theobald | |
| 10,545,509 B1 * | 1/2020 | Jessen | B62D 63/025 |
| 2005/0230934 A1 * | 10/2005 | Wilt | B62D 59/04 |
| | | | 280/400 |
| 2007/0288123 A1 | 12/2007 | D'Andrea et al. | |
| 2010/0044998 A1 | 2/2010 | Franchineau | |
| 2012/0073889 A1 | 3/2012 | Franzen et al. | |
| 2016/0129958 A1 | 5/2016 | Byrnes et al. | |
| 2016/0144906 A1 | 5/2016 | Han et al. | |
| 2017/0197678 A1 | 7/2017 | Scaringe | |
| 2017/0197679 A1 | 7/2017 | Scaringe et al. | |
| 2018/0345971 A1 * | 12/2018 | Birnschein | B60L 50/60 |

FOREIGN PATENT DOCUMENTS

| | | |
|---|---|---|
| CN | 107531162 A | 1/2018 |
| DE | 102016014882 A1 | 6/2017 |
| DE | 102016009685 A1 | 7/2017 |
| DE | 102016209099 A1 | 7/2017 |
| WO | 2017097422 A1 | 6/2017 |

OTHER PUBLICATIONS

Scania CV AB, International Application No. PCT/SE2019/050168, Written Opinion, Apr. 29, 2019.
Scania CV AB, International Application No. PCT/SE2019/050168, International Preliminary Report on Patentability, Sep. 8, 2020.
Scania CV AB, Brazilian Patent Application No. BR112020010886-3, Preliminary Office Action, May 9, 2023.
Scania CV AB, Chinese Patent Application No. 201980009021.0, Office Action, Dec. 17, 2021.
Scania CV AB, European Patent Application No. 19763661.6, Extended European Search Report, Oct. 27, 2021.

\* cited by examiner

METHOD FOR CONTROLLING ASSEMBLY OF A VEHICLE FROM A SET OF MODULES, A CONTROL DEVICE, A SYSTEM, A VEHICLE, A COMPUTER PROGRAM AND A COMPUTER-READABLE MEDIUM

CROSS-REFERENCE TO RELATED APPLICATIONS

This application is a national stage application (filed under 35 § U.S.C. 371) of PCT/SE2019/050168, filed Feb. 26, 2019 of the same title, which, in turn, claims priority to Swedish Application No 1850239-3 filed Mar. 6, 2018; the contents of each of which are hereby incorporated by reference.

FIELD OF THE INVENTION

The present invention relates to a method for controlling assembly of a vehicle from a set of modules. The present invention also relates to a first control device for controlling assembly of a vehicle, a second control device for controlling assembly of a vehicle, a system for controlling assembly of a vehicle, a vehicle assembled by means of the method, a computer program and a computer-readable medium.

BACKGROUND OF THE INVENTION

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle will only be used for the specific purpose. Thus, a bus will only be used as a bus and a garbage truck will only be used as a garbage truck. Different vehicles are thus needed for different purposes, which may require a large fleet of vehicles and which may be very costly. A more flexible vehicle which enables customization may therefore be desired.

There are, for example, known solutions where a truck can be rebuilt by changing a concrete mixer to a loading platform. This increases the flexibility and two different functions can be achieved by means of one single vehicle. Also, document US-2016/0129958 A discloses a modular electric vehicle using interchangeable vehicle assembly modules. The user can thereby disassemble and reassemble the vehicle for use in different applications. Disassembling and reassembling such a vehicle would, however, be very cumbersome and time consuming.

SUMMARY OF THE INVENTION

Despite known solutions in the field, it would be desirable to achieve a flexible vehicle, which solves or at least alleviates at least some of the drawbacks of the prior art. An object of the present invention is therefore to achieve a new and advantageous method for controlling assembly of a vehicle from a set of modules, which method is easier and less time consuming than prior art solutions. Another object of the invention is to achieve a new and advantageous control device, system, computer program and computer-readable medium for controlling assembly of a vehicle from a set of modules in an easier and less time consuming way.

The herein mentioned objects are achieved by a method for controlling assembly of a vehicle from a set of modules, a first control device, a second control device, a system, a vehicle, a computer program and a computer-readable medium according to the independent claims.

Hence, according to an aspect of the present invention a method performed by a first control device for controlling assembly of a vehicle from a set of modules is provided. The set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module. The method comprising: commanding a second control device of the at least one drive module to physically connect the at least one drive module with the at least one functional module to assemble a vehicle; and receiving, from at least one of the modules of the assembled vehicle, a verification of the connection between the modules.

According to another aspect of the invention a first control device for controlling assembly of a vehicle from a set of modules is provided, the set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module. The first control device being configured to: command a second control device of the at least one drive module to physically connect the at least one drive module with the at least one functional module to assemble a vehicle; and receive, from at least one of the modules of the assembled vehicle, a verification of the connection between the modules.

According to a further aspect of the invention a method performed by a second control device for controlling assembly of a vehicle from a set of modules is provided, the set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module, wherein the second control device is comprised in the at least one drive module, the method comprising: receiving, from a first control device, a command to physically connect the at least one drive module with the at least one functional module; controlling the at least one drive module to physically connect with the at least one functional module; and verifying the connection between the modules.

According to another aspect of the invention a second control device for controlling assembly of a vehicle from a set of modules is provided, the set of modules comprising: at least one drive module; and at least one functional module, wherein the at least one drive module comprises a pair of wheels and is configured to be autonomously operated, and wherein each module comprises at least one interface releasably connectable to a corresponding interface on another module, wherein the second control device is comprised in the at least one drive module, the second control device being configured to: receive, from a first control device, a command to physically connect the at least one drive module with the at least one functional module; control the drive module to physically connect with the at least one functional module; and verify the connection between the modules.

According to another aspect of the invention a system for controlling assembly of a vehicle from a set of modules is provided, the set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module, the system comprising: a first control device configured to command the at least one drive module to physically connect with the at least one functional module to assemble a vehicle and to receive, from at least one of the modules of the assembled vehicle, a verification of the connection between the modules; and a second control device configured to receive, from the first control module, a command to physically connect the drive module with the at least one functional module, control the at least one drive module to physically connect with the at least one functional module, and verify the connection between the modules.

According to another aspect of the invention, a vehicle is provided. The vehicle comprises at least one drive module and at least one functional module, wherein the at least one drive module comprises a pair of wheels and is configured to be autonomously operated, wherein the vehicle is assembled by means of a method as disclosed herein.

Assembling a vehicle from a set of modules makes it possible to dynamically assemble a vehicle depending on a current mission or function to be performed. This way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. The autonomously operated drive module receives a command from the first control device to physically connect with the at least one functional module. The second control device of the drive module subsequently controls the drive module to execute the command. This means that the drive module receives the command and autonomously/automatically performs the physical connection with the at least one functional module. This way, no manual work is required and the assembly of the vehicle is less cumbersome and much more time efficient. Since the assembly is performed autonomously and thereby is easier and quicker, assembly and disassembly of a vehicle may be performed more frequently. This way, a plurality of different vehicle types may be assembled from the set of modules during a day. For example, during daytime at least one drive module may be connected with a functional module to assemble a vehicle functioning as a bus and during the night, when there is no need for a bus, the same drive module may be used to assemble a vehicle functioning as a garbage truck. Because one and the same module can be used in various different types of vehicles the utilization of the modules can be optimized. Furthermore, in the event of errors, damages or breakage, the malfunctioning module can easily be removed from the vehicle and be repaired/fixed. The malfunctioning module can quickly be replaced with a functioning module and the assembled vehicle can thus continue its operation. The vehicle off road (VOR) time will thereby be reduced and the utilization of the vehicle will increase. By the verification of the connection, the first control device is informed that the command has been executed and that the modules are correctly connected. The verification may also trigger the first control device to give the assembled vehicle a command to perform a certain mission/function.

Further objects, advantages and novel features of the present invention will become apparent to one skilled in the art from the following details, and also by putting the invention into practice. Whereas embodiments of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

Figures 1, 2:
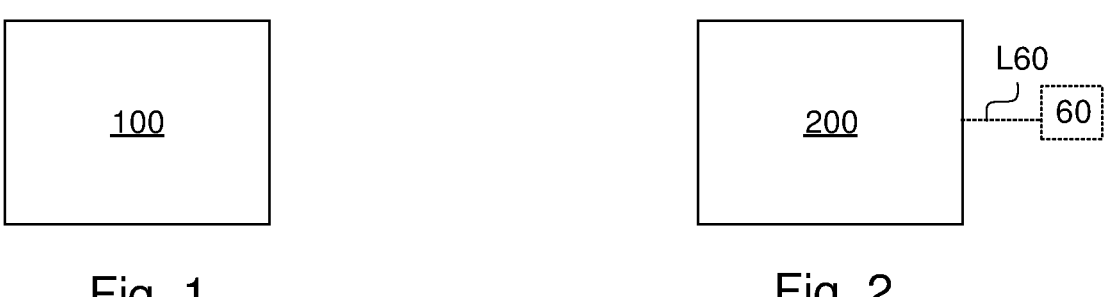
FIG. 1 schematically illustrates a first control device for controlling assembly of a vehicle according to an embodiment.
FIG. 2 schematically illustrates a second control device for controlling assembly of a vehicle according to an embodiment.

To be able to meet customers' different vehicle needs in a flexible and cost efficient way a method for achieving a modularized vehicle has been developed. A modularized vehicle according to the present disclosure is typically assembled at the customer's premises and the customer may thus buy a set of modules from a manufacturer. The present disclosure is applicable on all sorts of road vehicles. However, the disclosure may relate to heavy vehicles, such as buses, trucks etc. Specifically, the present disclosure may relate to vehicles for use on public roads.

According to an aspect of the present disclosure, a method performed by a first control device for controlling assembly of a vehicle from a set of modules is provided, the set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module, the method comprising: commanding a second control device of the at least one drive module to physically connect the at least one drive module with the at least one functional module to assemble a vehicle; and receiving, from at least one of the modules, a verification of the connection between the modules. By instructing an autonomously operated drive module to physically connect with the at least one functional module manual work is avoided and the assembly of the vehicle is easier and more time efficient. The verification informs the first control device that the vehicle is assembled in a correct way and that the vehicle thereby is ready to receive instructions regarding a function/mission to perform. It is to be understood that the at least one drive module is physically connected with the at least one functional module through their corresponding interfaces.

The first control device may command two drive modules to connect with the at least one functional module. Alternatively, the first control device may command the at least one drive module to connect with another drive module.

The method may further comprise receiving, from the second control device of the at least one drive module, an acceptance of the command to connect the at least one drive module with the at least one functional module. In the event that the received command cannot be executed it may be rejected by the second control device. The first control device may thus receive, from the second control device, a rejection of the command. In this case, the method will be ended for the drive module associated with the second control device. The first control device may then select another drive module and start the procedure all over again.

The set of modules may comprise a plurality of drive modules and a plurality of functional modules. The different drive modules may be identical or the drive modules may for example have different types/sizes of wheels. In one example the drive module comprises a body provided with a pair of wheels arranged on two opposite sides of the drive module. In an example, the drive module comprises only one pair of wheels. The drive module comprises at least one propulsion unit connected to the pair of wheels. The propulsion unit may be an electric machine, connected to the wheels. The pair of wheels of the drive module may thus be referred to as drive wheels. In one example, the drive module comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. This way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example the drive module further comprises at least one energy storage unit for providing the propulsion unit with energy. The energy storage unit may be an electric battery. The electric battery may be rechargeable. The drive module being configured to be autonomously operated means that the drive module comprises a plurality of sensors and systems for steering and driving the drive module automatically as an independent unit according to conventional methods. According to an example, the drive module comprises a navigation system and sensors for detecting objects in the surrounding of the drive module. The drive module may be referred to as an autonomously operated vehicle in the sense that it is allowed to operate on public roads.

Each functional module is configured to perform a predetermined function while being part of an assembled vehicle. In one example, the functional module is configured to accommodate or support a load. The at least one functional module may be configured for accommodating passengers and may thus function as a bus when being assembled with at least one drive module. The at least one functional module may alternatively be configured for transporting goods and may thus function as a truck when being assembled with at least one drive module. The at least one functional module may be any of a garbage truck body, a loading platform, a fork arrangement for a forklift, and a snowplough. The functional module may comprise trailing wheels which are not driven or steerable. A functional module cannot move on its own but needs to be connected to at least one drive module to be able to move and thereby function as a vehicle. The functional module may comprise an energy storage unit. The functional module may also comprise a control device, hereinafter referred to as a third control device, adapted to communicate with the first control device. The third control device may also be adapted to communicate with the second control device when the drive module and the functional module are electrically connected. The third control device may be adapted to receive the same command as the drive module in order for the functional module to prepare for connection with at least one drive module. The first control device may thus command the third control device to physically connect the at least one functional module with the at least one drive module. Alternatively, the functional module does not comprise any control device or electrical system for connection with the drive module.

The drive module and the functional module each suitably comprises at least one physical interface for the purpose of physically connecting the modules. Such physical interfaces may be configured in different ways, and may for example comprise coupling units adapted to engage, quick couplings, hooks, cooperating protrusions and recesses or similar. It is to be understood that the configuration of the physical interface is not part of the invention per se. The drive module may comprise a physical interface for connection with a functional module on at least two different sides of the drive module. This way, the drive module can be connected to a functional module in various ways and the flexibility is increased. According to an example, the drive module comprises a physical interface both on a front side of the drive module and on a rear side of the drive module. The same drive module can thereby be connected to a front section of a functional module and to a rear section of a functional module, without having to turn the drive module. Additionally or alternatively, the drive module may comprise a physical interface on a top side of the drive module. The different physical interfaces for connection with a functional module may be identical on all sides of the drive module. The physical interfaces of the drive module are adapted for connection with a functional module and/or another drive module. By using a standard interface which can be used for connection with another drive module as well as a functional module, the flexibility of the drive module increases and the assembly of a vehicle is facilitated.

Typically, a vehicle operator, such as a fleet manager or vehicle owner, has a list of requested functions/missions to be performed. Such functions/missions could be transporting persons, goods, garbage or similar. In order to perform a certain function/mission, the operator requires a specific vehicle and the operator typically plans which vehicle to use, when, and for which mission. According to an example of the present disclosure, the first control device receives information about at least one requested function/mission to be performed. The first control device may receive information about a plurality of requested function/mission to be performed. The first control device may also receive information about when the at least one function/mission is requested to be performed. Such information may comprise a certain day and a certain time of the day etc. In the event that the first control device receives a plurality of requested functions/missions to be performed, the first control device may determine an order of priority for the requested functions/missions and control the assembly of vehicles based on this priority. The order of priority may be determined based on information about time tables, time for loading/unloading, traffic accidents etc. In one example the first control device receives the information about the at least one function/mission to be performed from an operator. The information regarding the function/mission to be performed may be entered into the first control device via a user interface connected to the first control device, such as a touch screen, keyboard or similar. In another example the information regarding the function/mission is automatically entered into the first control device by means of for example Artificial Intelligence, based on requested functions/missions to be performed. When the first control device has information about a function/mission to be performed, the first control device may determine what type of vehicle is required to perform said function/mission.

The method may further comprise selecting the at least one functional module and/or the at least one drive module to assemble a vehicle. The at least one functional module to be connected with the at least one drive module may be selected based on a function to be performed by the assembled vehicle. As previously described, a specific vehicle is required to perform a certain function/mission and the first control device having knowledge about requested functions/mission may thereby select which functional module to use to achieve such a required vehicle, based on the determined type of vehicle required for the function/mission. The first control module subsequently transmits signals to the at least one drive module with the command of connecting physically with the selected functional module. By using the first control device to select a suitable functional module based on a function to be performed, a dynamic vehicle assembly is achieved and the manual work is reduced. The at least one drive module may be selected based on a function to be performed by the assembled vehicle. Furthermore, the at least one drive module may be selected based on the geographic area, the weather, road conditions or similar. For example, the function to be performed may require the vehicle to operate within a certain environment where a drive module with larger and more durable wheels should be used. By selecting the at least one functional module and/or the at least one drive module based on a function to be performed, a customized vehicle may be assembled, which is suitable for the function to be performed. Also, an assembled vehicle may be achieved, which is adapted to the surroundings and the operating conditions of the vehicle. The first control device may be able to communicate with all modules in the set of modules, and may thereby be aware of the status of each module. The status of a module may be referred to as the functional/operational status of the module. For example, the first control device may continuously receive and store information about the state of charge of the energy storage unit of each module. The at least one drive module and/or the at least one functional module may be selected based on the status of each module. When the vehicle has been assembled, the first control device may command the assembled vehicle to perform a mission/function. The mission/function may be communicated to the second control device of the at least one drive module, which automatically controls the assembled vehicle to perform the function/mission. According to an example, there is a handshake between the assembled vehicle and the first control device when the assembled vehicle has received the function/ mission to be performed. The handshake may be between the second control device and the first control device. When the assembled vehicle has performed its mission, the vehicle may be disassembled and the modules can be used to assemble a new vehicle for a new function or mission. Disassembly of the vehicle is suitably performed similarly to the assembly, by sending commands to the drive module, which executes the commands autonomously/automatically.

A sensor device may be arranged at the drive module and/or the functional module. The sensor device may be configured to sense when the drive module and the functional module have been correctly connected physically. The second control device of the drive module may be arranged in communication with the sensor device and may thereby receive a signal from the sensor device indicating that the connection was successfully performed. Once the second control device has received the signal from the sensor device the verification of the performed connection may be transmitted to the first control device. Alternatively, the sensor device is arranged in direct communication with the first control device, wherein the verification received by the first control device is the signal from the sensor device. In this manner, the first control device may receive, from at least one of the modules of the assembled vehicle, a verification of the connection between the modules. The sensor device may be arranged in direct communication with the first control device and the second control device.

The step of commanding the at least one drive module to physically connect with the at least one functional module may further comprise commanding the at least one drive module to electrically connect with the at least one functional module. The at least one drive module and the at least one functional module may each comprises at least one electrical interface for the purpose of connecting the modules electrically. Such an electrical interface may be configured to transfer electric energy and/or to transmit and/or receive electric signals. The electrical interface may be a wireless interface or a conductive interface. By connecting the drive module and the functional module electrically, the modules may transfer electric energy between each other and also share information. When the drive module and the functional module have been electrically connected, there may be a handshake between the modules. The sensor device verifying the physical connection as mentioned above may also be configured to sense when the electrical connection is performed. Alternatively, the drive module comprises another sensor for sensing when the electrical connection is performed. The received verification of the connection between the modules may thus comprise a verification of the physical connection and/or the electrical connection.

The modules of an assembled vehicle may communicate with each other and/or the first control device via 4G, 5G, V2I (Vehicle to Infrastructure), W-Fi or any other wireless communication means.

The method may further comprise generating a unique identity for the assembled vehicle. The unique identity may be transmitted to the second control device of the at least one drive module. The unique identity may be a number, a combination of letters and/or numbers, or a specific word. Suitably, the first control device generates a unique identity after the verification of the connection has been received. Thus, when the different modules are connected, a vehicle has been assembled and a unique identity may be generated. Thus, no matter if a module is exchanged due to malfunction, the unique identity remains the same. The unique identity thus remains the same until the vehicle is disassembled. The unique identity may be used in the communication between the first control device and any of the modules of the assembled vehicle.

The method may further comprise determining a configuration for the at least one drive module based on a function to be performed by the assembled vehicle, and transmitting the determined configuration to the second control device. The first control device may thus instruct the second control device of the at least one drive module to configure the at least one drive module based on a function to be performed by the assembled vehicle. The first control device may for example determine that certain suspension characteristics, certain brake settings and/or a certain steering ratio are required for the function to be performed by the assembled vehicle. The first control device may thus transmit instructions to the second control device of the drive module, such that the second control device configures the drive module accordingly. The configuration instructions from the first control device may also be based on the selected functional module connected with the drive module.

According to an example, the determined configuration is defined by configuration parameters associated with characteristics of the drive module including at least one of suspension, braking, steering and power outtake. The configuration parameters relating to the suspension of the drive module may comprise suspension travel and/or stiffness of the suspension. The configuration parameters relating to the steering may comprise a maximum steering angle or similar. The configuration parameters relating to braking may comprise a maximum braking force or similar. The configuration parameters relating to power outtake may comprise allowing different levels of power outtake depending on the mission/function to be performed by the assembled vehicle.

The at least one drive module may be associated with a registration number. The at least one drive module may thereby be seen as an independent vehicle. In the case where the assembled vehicle comprises two drive modules, each drive module is associated with a different registration number. The first control device may determine which of the drive modules should show its registration number. In the event that the assembled vehicle comprises two drive modules, the first control device may appoint one drive module to be master and the other to be slave. Typically, the master will be commanded to show its registration number and the slave will not show its registration number. The first control device may thus transmit instructions regarding registration number to the second control device of the at least one drive module.

The present disclosure also relates to a first control device for controlling assembly of a vehicle from a set of modules, the set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module, the first control device being configured to: command a second control device of the at least one drive module to physically connect the at least one drive module with the at least one functional module to assemble a vehicle; and receive, from at least one of the modules, a verification of the connection between the modules.

The first control device may be configured to determine a configuration for the at least one drive module based on a function to be performed by the assembled vehicle, and to transmit the determined configuration to the second control device. The first control device may thus be configured to transmit configuration instructions to the second control device.

It will be appreciated that all the embodiments described for the method aspect of the invention performed by the first control device are also applicable to the first control device aspect of the invention. That is, the first control device may be configured to perform any one of the steps of the method according to the various embodiments described above.

The first control device may be referred to as a control centre or an off-board system. The first control device may be geographically on a distance from the modules. The first control device may be adapted to receive information about missions or functions to be performed and based on this mission/function initiate the assembly of a vehicle. The first control device may be adapted to receive this information from an operator via a user interface. The first control device may be implemented as a separate entity or distributed in two or more physical entities. The first control device may comprise one or more computers. The first control device may thus be implemented or realized by the first control device comprising a processor and a memory, the memory comprising instructions, which when executed by the processor causes the first control device to perform the herein disclosed method.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above.

The present disclosure further relates to a method performed by a second control device for controlling assembly of a vehicle from a set of modules, the set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module, wherein the second control device is comprised in the at least one drive module, the method comprising: receiving, from a first control device, a command to physically connect the at least one drive module with the at least one functional module; controlling the at least one drive module to physically connect with the at least one functional module; and verifying the connection between the modules. The second control device and thus the drive module is commanded to connect physically with the at least one functional module and the second control device subsequently executes the command by controlling the at least one drive module to physically connect with the at least one functional module. The at least one drive module is physically connected with the at least one functional module through their corresponding interfaces. By the method according to this example the drive module performs the connection with the at least one functional module, and thus the assembly of the vehicle, autonomously/automatically. A quick and easy assembly of a vehicle is thereby achieved. When the second control device has received the command, the second control device may accept the command and prepare for the connection. The acceptance of the command is transmitted to the first control device. The second control device may subsequently control the drive module to connect physically with the functional module. In the event that the received command cannot be executed it may be rejected by the second control device. The second control device may thus transmit, to the first control device, a rejection of the command. In this case, the method will be ended for the drive module associated with the second control device. The first control device may then select another drive module and start the procedure all over again. The second control device may reject the command based on for example internal data regarding operational status of the drive module. The functional module may also receive the command and prepare for the physical connection. As previously described a sensor device may be arranged at the drive module and/or the functional module for determining when the drive module and the functional module have been physically connected. The second control device of the drive module may be arranged in communication with the sensor device. The method may thus comprise receiving a signal from the sensor device indicating that the connection was successfully performed, and verifying the performed connection to the first control device.

Controlling the at least one drive module to physically connect with the at least one functional module may comprise controlling the propulsion and the steering of the drive module, such that the drive module is moved to the functional module to connect with. Controlling the at least one drive module to physically connect with the at least one functional module may also comprise identifying the location of the functional module to connect with. Controlling the at least one drive module to physically connect with the at least one functional module may further comprise controlling the physical interface of the drive module, such that it connects with the corresponding physical interface of the functional module.

The step of receiving, from a first control device, a command to physically connect the at least one drive module with the at least one functional module may further comprise receiving, from the first control device, a command to electrically connect the at least one drive module with the at least one functional module. The step of controlling the at least one drive module to physically connect with the at least one functional module may thereby further comprise controlling the drive module to electrically connect with the at least one functional module. As mentioned above with regard to the method performed by the first control device, the at least one drive module and the at least one functional module may each comprise at least one electrical interface for the purpose of connecting the individual modules electrically. How the electrical interface is configured is not part of this invention per se. The drive module is suitably physically connected to the functional module before controlling the drive module to connect electrically. Controlling the drive module to electrically connect with the at least one functional module may comprise controlling a switch, a contactor or similar. Controlling the drive module to electrically connect with the at least one functional module may additionally or alternatively comprise inserting a plug into a socket. Once the electrical connection has been performed, energy transfer and/or communication between the modules is enabled. Connecting the drive module electrically with the functional module may work similar to plug and play. That is, as soon as the modules are connected they are ready to go without a need for reconfiguration of the modules. When the drive module and the functional module have been electrically connected there is thus a handshake between the modules. The sensor device sensing the physical connection may also be configured to determine when the electrical connection has been correctly performed. The step of verifying the connection between the drive module and the at least one functional module may thus comprise verifying the physical connection and/or the electrical connection.

The method may further comprise receiving, from the first control device, a unique vehicle identity. As described above with regard to the method performed by the first control device, a unique vehicle identity may be generated by the first control device when the vehicle has been assembled. The second control device may store the unique vehicle identity in a memory and may use it for any further communication with the first control device while being part of the assembled vehicle.

The method may also comprise receiving, from the first control device, instructions regarding a registration number. Each drive module may comprise a registration number and in the event that two or more drive modules are used in an assembled vehicle, only one registration number should be shown. The at least one drive module may thus receive instructions to either show or not show the registration number. The registration number may be presented on a digital screen on the drive module. In the event that the drive module showing the registration number malfunctions, the registration number may be presented by another drive module of the assembled vehicle or the registration number may be presented by a new drive module replacing the malfunctioning drive module. Alternatively, the registration number may be displayed on a display of the functional module.

The method may further comprise receiving, from the first control device, a configuration for the at least one drive module, wherein the configuration is determined based on a function to be performed by the assembled vehicle, and configuring the at least one drive module according to the received configuration. The second control device may receive instructions to configure the drive module regarding suspension characteristics, brake settings, steering ratio etc. The configuration instructions are suitably received when the drive module is connected with the functional module and the vehicle is assembled and ready for receiving a mission or function to perform. Different configurations of the drive module may be required when the drive module forms part of a vehicle performing the function of transporting people, transporting goods, shovelling snow etc. The drive module may also be dynamically configured based on the surroundings in which the vehicle will perform its function. Thus, different suspension characteristics may for example be required if the vehicle will be operated in a rough terrain compared to if the vehicle will be operated on a highway. The first control device may thus transmit instructions to the second control device of the drive module, such that the second control device configures the drive module accordingly. The configuration instructions may also be based on the functional module connected with the drive module. By dynamically configuring the drive module depending on the function to be performed the drive module, and thus the assembled vehicle, is easily adapted for the upcoming task and the function and the comfort/safety of the vehicle is thereby ensured. Adapting and optimizing vehicle characteristics for specific vehicle functions or missions by dynamically reconfiguring the modules as described also leads to reduced component wear with lesser vehicle off road, VOR, time and increased service time for the respective modules.

Alternatively, the method further comprises configuring the at least one drive module according to at least one stored configuration, wherein the at least one stored configuration is based on a function to be performed by the assembled vehicle. There may be configurations of the drive module, which are more common than other configurations. Such configurations may be stored in the second control device or in a separate memory connected to the second control device. Thus, the second control device may be configured to store a plurality of different configurations for the at least one drive module, where each configuration is associated with a certain type of assembled vehicle and/or a certain function to be performed by the assembled vehicle. This way, when the second control device knows which type of assembled vehicle the drive module will be part of, and/or when the second control device knows which function the assembled vehicle should perform, the stored configuration of the drive module associated with such assembled vehicle and/or such function to be performed is used to configure the at least one drive module. For example, if the at least one drive module is part of a garbage truck, a stored configuration associated with a garbage truck may easily be brought from the second control device or the memory connected to the second control device and the at least one drive module will be configured accordingly. According to an example, the at least one configuration for the at least one drive module is stored in the third control device of the functional module. Thus, when the at least one drive module and the functional module are connected, the second control device of the at least one drive module receives a stored configuration from the third control device of the functional module and the at least one drive module is thereafter configured according to the received configuration.

The method may thus comprise configuring the at least one drive module according to a stored configuration or a received configuration for the at least one drive module, wherein the configuration is based on a function to be performed by the assembled vehicle.

The present disclosure also relates to a second control device for controlling assembly of a vehicle from a set of modules, the set of modules comprising: at least one drive module; and at least one functional module, wherein the at least one drive module comprises a pair of wheels and is configured to be autonomously operated, and wherein each module comprises at least one interface releasably connectable to a corresponding interface on another module, wherein the second control device is comprised in the at least one drive module, the second control device being configured to: receive, from a first control device, a command to physically connect the at least one drive module with the at least one functional module; control the drive module to physically connect with the at least one functional module; and verify the connection between the modules.

According to an example, the second control device is configured to receive, from the first control device, a configuration for the at least one drive module, wherein the configuration is determined based on a function to be performed by the assembled vehicle, and to configure the at least one drive module according to the received instructions. According to an example, the second control device is configured to configure the at least one drive module according to at least one stored configuration, wherein the at least one stored configuration is based on a function to be performed by the assembled vehicle. The second control device may thus be configured to store at least one configuration for the at least one drive module, wherein the at least one configuration is based on a function to be performed by the assembled vehicle. According to an example the second control device is configured to receive, from the third control device of the functional module, a stored configuration for the at least one drive module, wherein the at least one stored configuration is based on a function to be performed by the assembled vehicle. The second control device may thus be configured to configure the at least one drive module according to a stored configuration or a received configuration for the at least one drive module, wherein the configuration is based on a function to be performed by the assembled vehicle.

It will be appreciated that all the embodiments described for this method aspect of the invention are also applicable to the second control device aspect of the invention. That is, the second control device may be configured to perform any one of the steps of the method performed by the second control device according to the various embodiments described above.

The drive module comprises the second control device and the second control device may be configured to control the operation of the drive module. The second control device may thus be configured to transmit control signals to the various systems and components of the drive module for controlling for example the steering and the propulsion of the drive module. The second control device may be adapted to operate the drive module autonomously based on received commands, e.g. from the first control device, and based on sensor input regarding its surroundings and positioning. The second control device is thus adapted to receive commands from a remotely located control device, which may be the first control device or another control device, and to convert the command into control signals for controlling the various systems and components of the drive module. The second control device may be configured to receive data about the surroundings from various sensor devices, and based on this data control the drive module. The second control device may also be adapted to communicate with traffic systems of various kinds. The second control device may thereby be able to determine the status of a traffic light, determine if an accident has occurred and based on that determine a new route for the vehicle, or itself if not connected to a functional module, etc. The second control device may be adapted to communicate directly with such traffic systems or it may be adapted to communicate with such traffic systems via the first control device. The second control device may be implemented as a separate entity or distributed in two or more physical entities. The second control device may comprise one or more computers. The second control device may thus be implemented or realized by the second control device comprising a processor and a memory, the memory comprising instructions, which when executed by the processor causes the first control device to perform the herein disclosed method.

The present disclosure also relates to a computer program comprising instructions which, when the program is executed by a computer, cause the computer to carry out the method relating to the second control device. The invention also relates to a computer-readable medium comprising instructions, which when executed by a computer, cause the computer to carry out the method relating to the second control device.

Furthermore, the present disclosure relates to a system for controlling assembly of a vehicle from a set of modules, the set of modules comprising: at least one drive module; and at least one functional module, wherein the at least one drive module comprises a pair of wheels and is configured to be autonomously operated, and wherein each module in the set of modules comprises at least one interface releasably connectable to a corresponding interface on another module, the system comprising: a first control device configured to command the at least one drive module to physically connect with the at least one functional module to assemble a vehicle, and to receive, from at least one of the modules of the assembled vehicle, a verification of the connection between the modules; and a second control device configured to receive, from the first control module, a command to physically connect the drive module with the at least one functional module, control the at least one drive module to physically connect with the at least one functional module; and to verify the connection between the modules. By means of this system a less cumbersome, time efficient and thus cost efficient assembly of a vehicle from a set of modules is achieved. Also, the utilization of the different modules can be increased and vehicles can be assembled, which better fulfils the customer needs and perform specific functions in a better way.

According to an example of the system, the first control device is configured to determine a configuration for the at least one drive module based on a function to be performed by the assembled vehicle, and transmit the determined configuration to the second control device, and the second control device is configured to receive, from the first control device, the configuration for the at least one drive module, and to configure the at least one drive module according to the received configuration.

The present disclosure further relates to a vehicle. The vehicle comprises at least one drive module and at least one functional module, wherein the at least one drive module comprises a pair of wheels and is configured to be autonomously operated, wherein the vehicle is assembled by means of the methods as disclosed herein.

The present disclosure will now be further illustrated with reference to the appended figures.

The term "link" refers herein to a communication link which may be a physical connection such as an opto-electronic communication line, or a non-physical connection such as a wireless connection, e.g. a radio link or microwave link.

Figure 4:
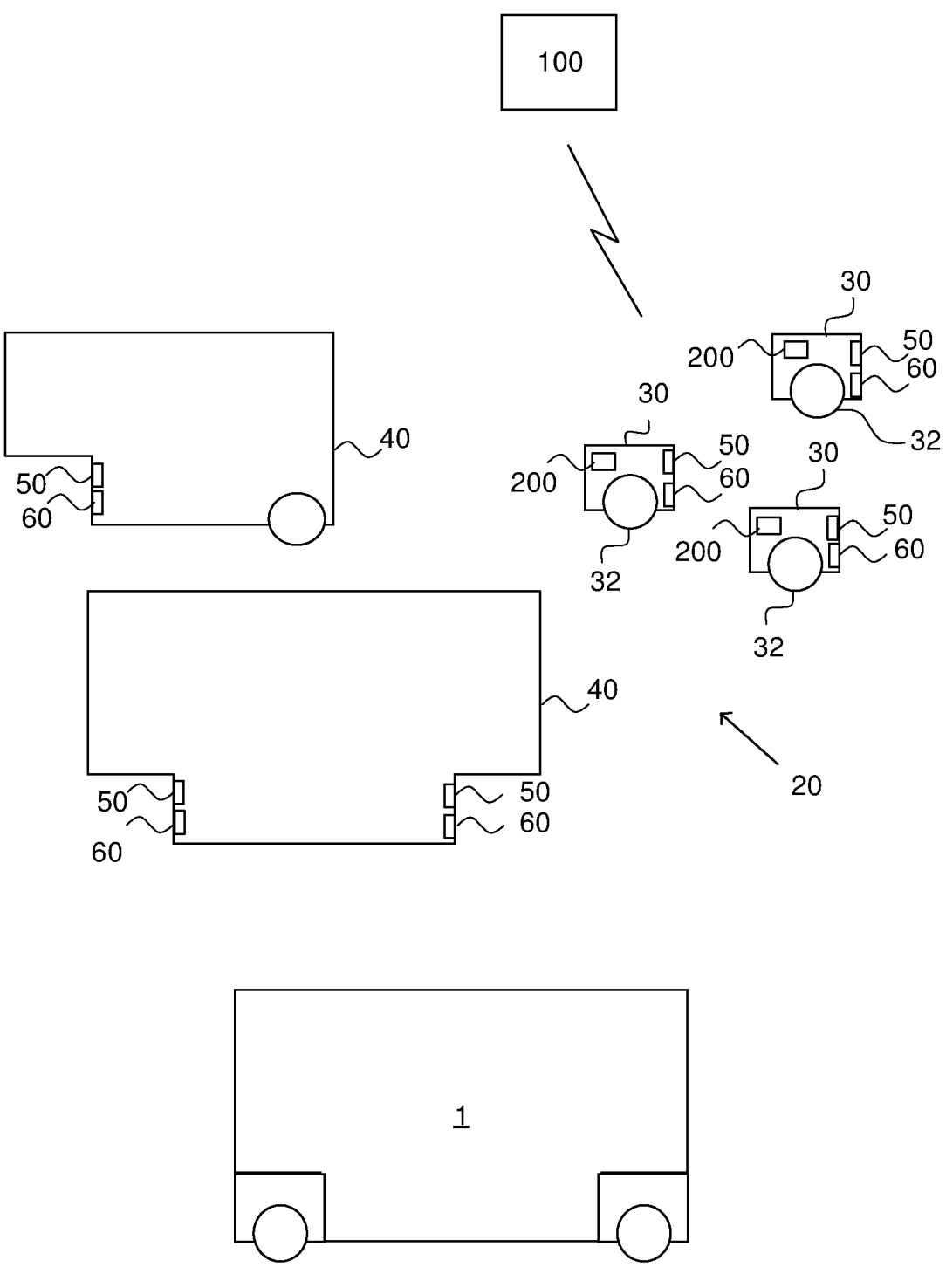
FIG. 4 schematically illustrates application of a system for controlling assembly of a vehicle according to an embodiment.

FIG. 1 schematically illustrates a first control device 100 for controlling assembly of a vehicle from a set of modules according to an embodiment. The first control device 100 may be configured to command a second control device of at least one drive module 30 to physically connect the at least one drive module 30 with a functional module 40 to assemble a vehicle 1. The second control module 200 is illustrated in FIG. 2 and the set of modules 20 with the drive module 30 and the functional modules 40 is illustrated in FIG. 4. The set of modules 20 may comprise a plurality of drive modules 30 and a plurality of functional modules 40. The first control device 100 may be referred to as a control center, off-board system or similar. The first control device 100 may thus be on a remote location in relation to the set of modules 20. The first control device 100 may be configured to receive information regarding a requested function/mission to be performed and to determine which vehicle is required to perform this function/mission. The first control device 100 may further be configured to select the functional module 40 to be connected with the at least one drive module 30 based on a function to be performed by the assembled vehicle 1. The first control device 100 may also be configured to select the at least one drive module 30 based on the function to be performed by the assembled vehicle 1. The first control device 100 may also be configured to receive, from at least one of the modules 30, 40 of the assembled vehicle 1, a verification of the connection between the modules 30, 40. The verification may be a signal indicating that the connection has been correctly performed. The first control device 100 may be adapted to receive such verification from the second control device 200 of the drive module 30, or from a sensor device 60 arranged at the drive module 30 or the functional module 40. The first control device 100 may also be configured to command the second control device 200 and thus the drive module 30 to connect electrically with the functional module 40. The verification received from at least one of the modules 30, 40 may thus comprise a verification of the physical connection and/or the electrical connection. The first control device 100 may be configured to receive, from the second control device 200, an acceptance of the command to physically and/or electrically connect the at least one drive module 30 with the at least one functional module 40. Furthermore, the first control device 100 may be configured to generate a unique vehicle identity for the assembled vehicle 1. The first control device 100 may be configured to generate a unique vehicle identity when a verification of the physical and/or electrical connection has been received. The first control device 100 may further be configured to determine a configuration for the at least one drive module 30 based on a function to be performed by the assembled vehicle 1, and transmitting the determined configuration to the second control device 200. The first control device 100 may also be configured to send instructions regarding a registration number to the second control device 200 of the drive module 30. The first control device 100 may further be configured to command the assembled vehicle 1 to perform a function/mission. Such command may be transmitted to the second control device 200 of the at least one drive module 30.

FIG. 2 schematically illustrates a second control device 200 for controlling assembly of a vehicle 1 from a set of modules 20 according to an embodiment. The second control device 200 may be configured to receive, from the first control device 100, a command to physically connect at least one drive module 30 with a functional module 40 and to control the at least one drive module 30 to physically connect with the functional module 40. The first control device 100 is illustrated in FIG. 1 and the drive module 30 and the functional modules 40 are illustrated in FIG. 4. The second control device 200 may also be configured to verify the physical connection between the modules 30, 40. The second control device 200 may also be configured to transmit an acceptance of the received command to the first control device 100. The command to physically connect the drive module 30 with the functional module 40 may comprise a command to electrically connect the drive module 30 with the functional module 40. The second control device 200 may thus be configured to control the at least one drive module 30 to connect electrically with the functional module 40. The second control device 200 may be arranged in communication with a sensor device 60 arranged on the drive module 30 and/or the functional module 40. The second control device 200 may be arranged to communicate with the sensor device 60 via a link L60. The second control device 200 may be configured to receive a signal from the sensor device 60 indicating that the physical and/or electrical connection has been correctly performed. The second control device 200 may be configured to verify the physical and/or electrical connection between the modules 30, 40 by means of sending a verification signal to the first control device 100. The second control device 200 may be configured to receive, from the first control device 100, a unique vehicle identity for the assembled vehicle 1. The second control device 200 may also be configured to receive, from the first control device 100, a configuration for the drive module 30, wherein the configuration is determined based on a function to be performed by the assembled vehicle 1, and to configure the drive module 30 according to the received configuration. The second control device 200 may also be configured to configure the drive module 30 according to a stored configuration, wherein the stored configuration is based on a function to be performed by the assembled vehicle 1. The second control device 200 may also be configured to receive, from the first control device 100, instructions regarding a registration number.

Figure 3:
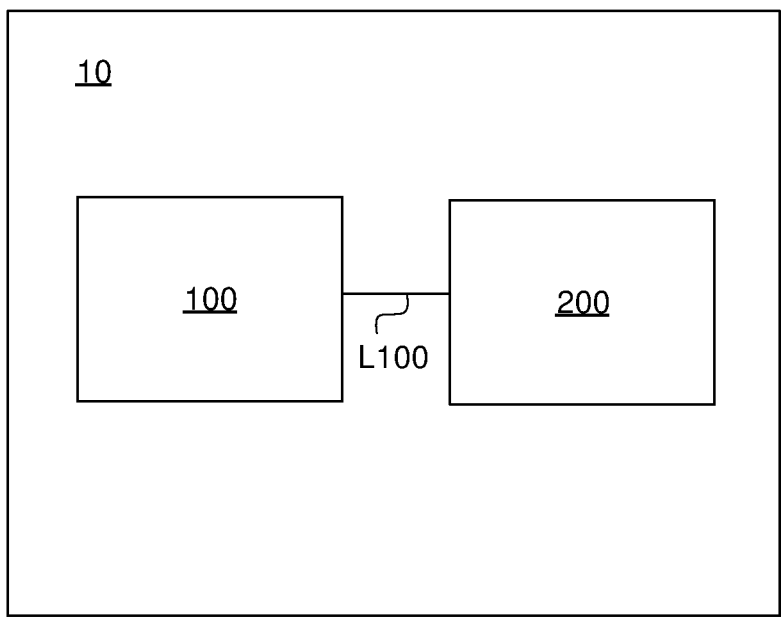
FIG. 3 schematically illustrates a system for controlling assembly of a vehicle according to an embodiment.

FIG. 3 schematically illustrates a system 10 for controlling assembly of a vehicle 1 from a set of modules 20 according to an embodiment. The set of modules 20 may comprise at least one drive module 30 and at least one functional module 40. The system 10 may comprise a first control device 100 as disclosed in FIG. 1 and a second control device 200 as disclosed in FIG. 2. The second control device 200 is comprised in the drive module 30. Thus, in the event that the set of modules 20 comprises a plurality of drive modules 30 the system 10 comprises a plurality of second control devices 200. The first control device 100 and the second control device 200 may be configured to communicate with each other via a link L100.

FIG. 4 schematically shows an example of an application of a system 10 as disclosed in FIG. 3. Thus, FIG. 4 illustrates a context in which the system 10 may be used. The figure illustrates a set of modules 20 for assembling a vehicle 1. An assembled vehicle 1 is also illustrated. The set of modules 20 comprises a plurality of drive modules 30 and a plurality of functional modules 40, wherein each drive module 30 comprises a pair of wheels 32 and is configured to be autonomously operated, and wherein each module 30, 40 in the set of modules 20 comprises at least one interface 50 releasably connectable to a corresponding interface 50 on another module 30, 40. By combining drive modules 30 and functional modules 40 different types of vehicles 1 can be achieved. Some vehicles 1 require two drive modules 30 and some vehicles 1 only require one drive module 30, depending on the structural configuration of the functional module 40. Each drive module 30 comprises a second control device 200 as disclosed in FIG. 2 and can thus communicate with a first control device 100 also referred to as control center. In this figure the drive modules 30 are illustrated with only one interface 50, on one side of the drive module 30. However, it is to be understood that each drive module 30 may comprise a plurality of interfaces 50 for releasable connection with other modules 30, 40. The interface(s) 50 of the drive modules 30 may be arranged on different sides of the drive module 30 and thus enable connection with other modules 30, 40 on multiple sides of the drive module 30. The interfaces 50 on the drive modules 30 and the functional modules 40 respectively, are suitably arranged on corresponding positions to enable connection between the modules 30, 40, An example of a sequence for vehicle assembly will be described below. An operator may receive a mission from a client to transport goods from one location to another. The operator enters the information about the mission into the first control device 100 via a user interface, such as a touch screen or similar. It is pointed out that this is merely an example, and the received mission may automatically be translated and/or inputted to the first control device 100. The first control device 100 then determines which function to be performed and thus which type of vehicle 1 is required to complete the mission. In this example, the required vehicle 1 may be a truck. The first control device 100 also selects which modules 30, 40 to use for the required truck. The type of vehicle 1 and the modules 30, 40 required to complete the mission may for example be selected based on information about the goods, the distance to travel and/or the geographical location. The first control device 100 then suitably converts the mission into a command for one or two selected drive modules 30 to physically and electrically connect with the selected functional module 40. The second control devices 200 of the drive modules 30 each receives the command and converts the command to control signals for the respective drive module 30. The drive modules 30 are thereby controlled to physically and electrically connect with the functional module 40. Controlling the drive module 30 to connect with a functional module 40 may comprise controlling the drive module 30 to identify the position of the selected functional module 40 and move to that position. The position of the selected functional module 40 may be determined based on information received in the command to connect the drive module 30 with the functional module 40. Alternatively, the command to connect the drive module 30 and the functional module 40 is transmitted to both the drive module 30 and the functional module 40, whereby the functional module 40 prepares for the connection and starts transmitting a signal. The drive module 30 may then determine the position of the functional module 40 based on this transmitted signal. The drive modules 30 are thus autonomously operated to find the selected functional module 40 and connect with that functional module 40. At least one sensor device 60 arranged at the drive modules 30 and/or the functional module 40 may be configured to sense when the physical and/or electrical connection has been performed. The at least one sensor device 60 may send a signal to the second control devices 200 indicating that the connection(s) have been performed. Based on the signal from the at least one sensor device 60, the second control device 200 may send a verification signal to the first control device 100 for verification of the connection(s). The first control device 100 may then generate a unique vehicle identity for the assembled vehicle 1. A vehicle 1 is thus assembled and the vehicle 1 is ready to perform the mission.

Figure 5A:
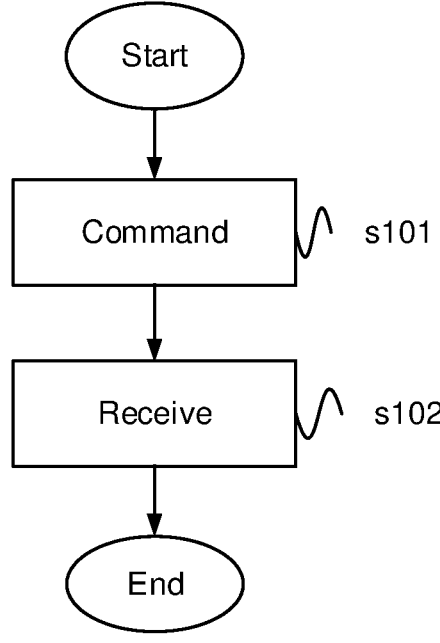
FIG. 5a-c illustrates flow charts for a method performed by a first control device for controlling assembly of a vehicle according to an embodiment.

FIG. 5*a* illustrates a flow chart for a method performed by a first control device 100 for controlling assembly of a vehicle 1 from a set of modules 20 according to an embodiment. The method thus relates to the first control device 100 as disclosed in FIG. 1 and the set of modules 20 as disclosed in FIG. 4. The set of modules 20 thus comprises at least one drive module 30 and at least one functional module 40. The method comprises commanding s101 a second control device 200 of at least one drive module 30 to physically connect the at least one drive module 30 with the at least one functional module 40 to assemble a vehicle 1; and receiving s102, from at least one of the modules 30, 40 of the assembled vehicle 1, a verification of the connection between the modules 30, 40. A vehicle 1 is thereby assembled autonomously, without the need of cumbersome and time consuming manual work.

Figure 5B:
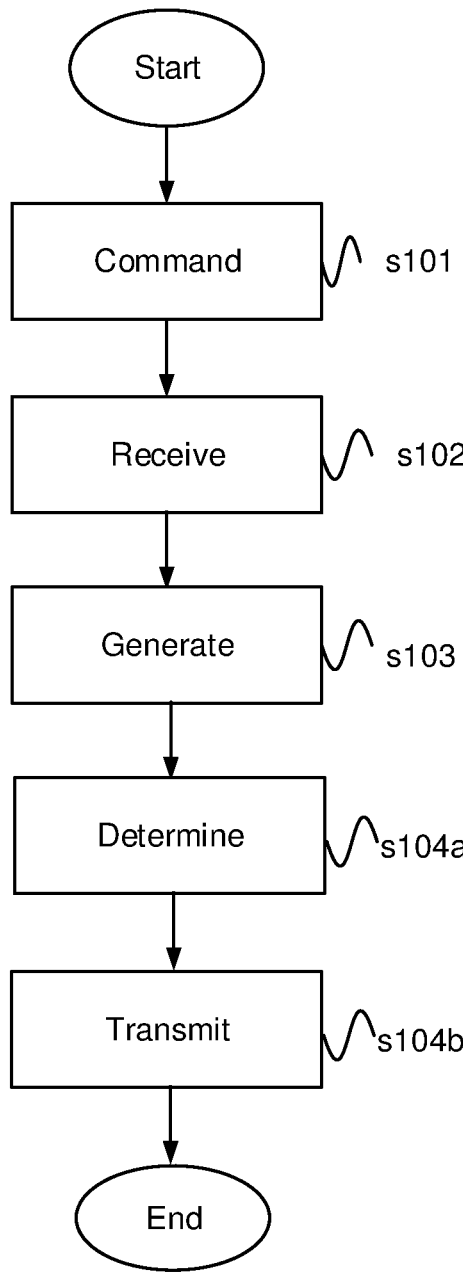

FIG. 5*b* illustrates a flow chart for a method performed by a first control device 100 for controlling assembly of a vehicle 1 from a set of modules 20 according to an embodiment. The method thus relates to the first control device 100 as disclosed in FIG. 1 and the set of modules 20 as disclosed in FIG. 4. The method comprises commanding s101 a second control device 200 of at least one drive module 30 to physically connect the at least one drive module 30 with the at least one functional module 40 to assemble a vehicle 1; receiving s102, from at least one of the modules 30, 40 of the assembled vehicle 1, a verification of the connection between the modules 30, 40; and generating s103 a unique vehicle identity for the assembled vehicle 1. The method may further comprise determining s104*a* a configuration for the at least one drive module 30 based on a function to be performed by the assembled vehicle 1, and transmitting s104*b* the determined configuration to the second control device 200. The method steps are suitably performed sequentially in the order of appearance.

Commanding s101 the at least one drive module 30 to connect physically with the at least one functional module 40 may also comprise commanding the at least one drive module 30 to connect electrically with the at least one functional module 40.

Receiving s102 a verification of the connection between the modules 30, 40 may comprise receiving a verification of the physical and/or electrical connection. The verification of the connection may be received from the second control device 200 of the at least one drive module 30, or from a sensor device 60 arranged at the at least one drive module 30 and/or the at least one functional module 40.

Figure 5C:
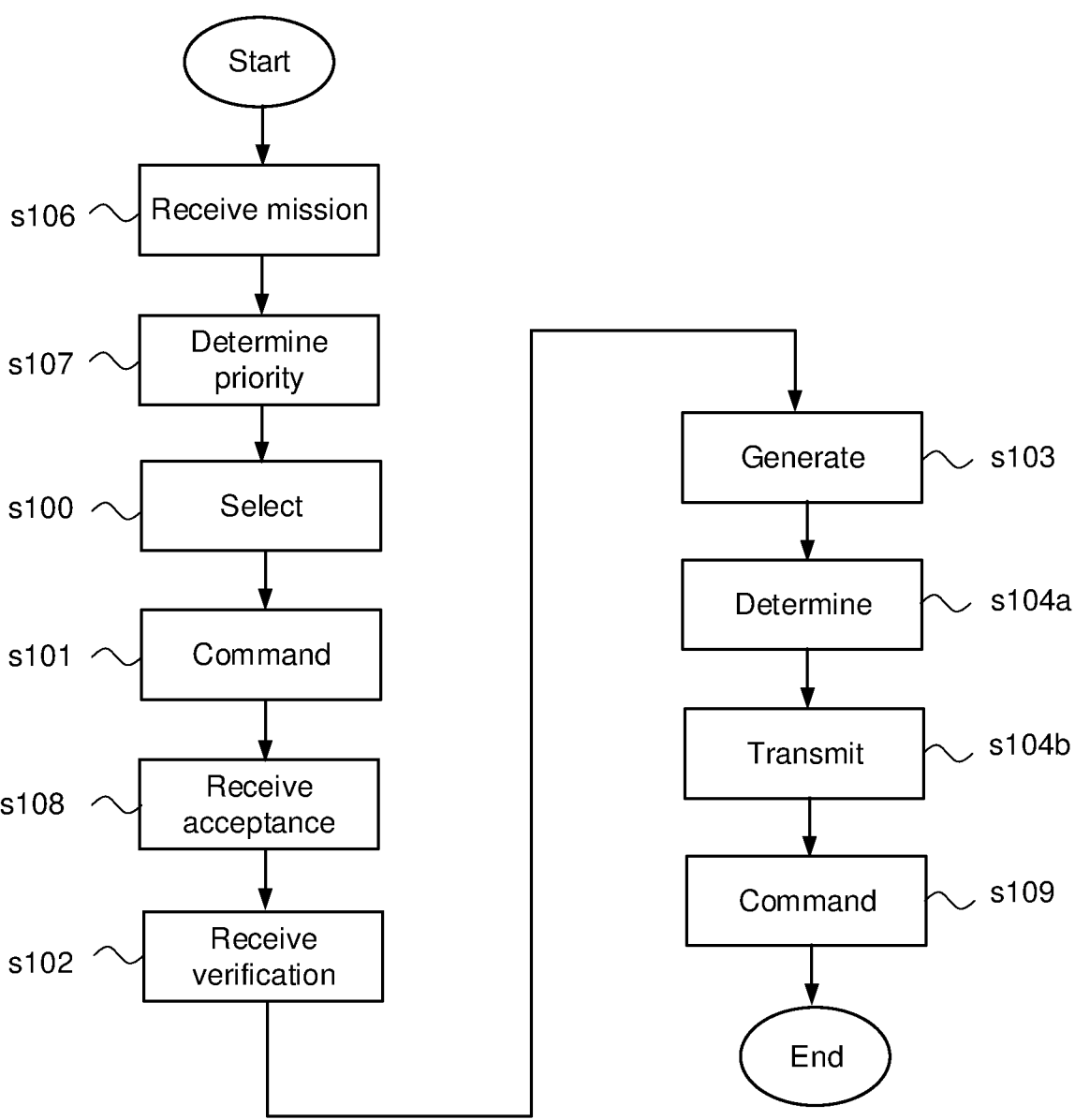

FIG. 5*c* illustrates a flow chart for a method performed by a first control device 100 for controlling assembly of a vehicle 1 from a set of modules 20 according to an embodiment. The method thus relates to the first control device 100 as disclosed in FIG. 1 and the set of modules 20 as disclosed in FIG. 4.

The method according to this example comprises receiving s106 information about at least one requested function/mission to be performed. Such a function/mission may be, transporting people, transporting goods from A to B, shovelling snow, lifting goods etc. The first control device 100 may receive information about when the at least one function/mission is requested to be performed, such as a certain day and a certain time of the day etc. In the event that the first control device 100 receives a plurality of requested functions/missions to be performed, the method may also comprise determining s107 an order of priority for the requested functions/missions. The order of priority may be determined based on information about time tables, time for loading/unloading, traffic accidents etc.

The method may further comprise selecting s100 at least one functional module 40 and/or at least one drive module 30 for assembling a vehicle 1. The at least one functional module 40 to be connected with the at least one drive module 30 may be selected s100 based on the function to be performed by the assembled vehicle 1. The function to be performed depends on the received mission. By using the first control device 100 to select a suitable functional module 40 based on a function to be performed, a dynamic vehicle assembly is achieved and the manual work is reduced. The at least one drive module 30 may also be selected s100 based on a function to be performed by the assembled vehicle 1. Furthermore, the at least one drive module 30 may be selected s100 based on the geographic area, the weather, road conditions or similar. For example, the function to be performed may require the vehicle 1 to operate within a certain environment where a drive module 30 with larger and more durable wheels should be used. The at least one drive module 30 and/or the at least one functional module 40 may be selected s100 based on the status of each module 30, 40. By selecting s100 the at least one functional module 40 and/or the at least one drive module 30 based on a function to be performed, a customized vehicle 1 may be assembled, which is suitable for the function to be performed.

The method further comprises commanding s101 a second control device 200 of at least one drive module 30 to physically connect the at least one drive module 30 with the at least one functional module 40 to assemble a vehicle 1. Commanding s101 the at least one drive module 30 to connect physically with the at least one functional module

40 may also comprise commanding s101 the at least one drive module 30 to connect electrically with the at least one functional module 40.

The method according to this example also comprises receiving s108, from the second control device 200, an acceptance of the command to connect the at least one drive module 30 with the at least one functional module 40.

Furthermore, the method comprises receiving s102, from at least one of the modules 30, 40 of the assembled vehicle 1, a verification of the connection between the modules 30, 40. The verification may comprise a verification of the physical connection and/or a verification of the electrical connection.

The method also comprises generating s103 a unique vehicle identity for the assembled vehicle 1. The unique identity may be transmitted to the second control device 200 of the at least one drive module 30. The unique identity may be a number, a combination of letters and/or numbers, or a specific word. Suitably, the first control device 100 generates s103 a unique identity after the verification of the connection has been received s102. Thus, when the different modules 30, 40 are connected, a vehicle 1 has been assembled and a unique identity may be generated s103. The unique identity may be used in the communication between the first control device 100 and any of the modules 30, 40 of the assembled vehicle 1.

The method further comprises determining s104*a* a configuration for the at least one drive module 30 based on the function to be performed by the assembled vehicle 1, and transmitting s104*b* the determined configuration to the second control device 200. Thus, the first control device 100 may transmit configuration instructions to the second control device 200, wherein the configuration instructions are based on the function to be performed by the assembled vehicle 1. The first control device 100 may for example determine that certain suspension characteristics, certain brake settings and/or a certain steering ratio are required for the function to be performed by the assembled vehicle 1. The configuration instructions from the first control device 100 may also be based on the selected functional module 40 connected with the drive module 30. The determined configuration may be defined by configuration parameters associated with characteristics of the drive module 30 including at least one of suspension, braking, steering and power outtake.

The method further comprises commanding s109 the assembled vehicle 1 to perform a function/mission. The first control device 100 may thus command the second control device 200 of the at least one drive module 30 to control the assembled vehicle 1, such that the function/mission is performed. When the second control device 200 has received the command to perform a certain function/mission there may be an electronic handshake between the second control device 200 and the first control device 100.

When the assembled vehicle 1 has performed its mission, the vehicle 1 may be disassembled and the modules 30, 40 can be used to assemble a new vehicle 1 for a new function or mission.

Figure 6A:
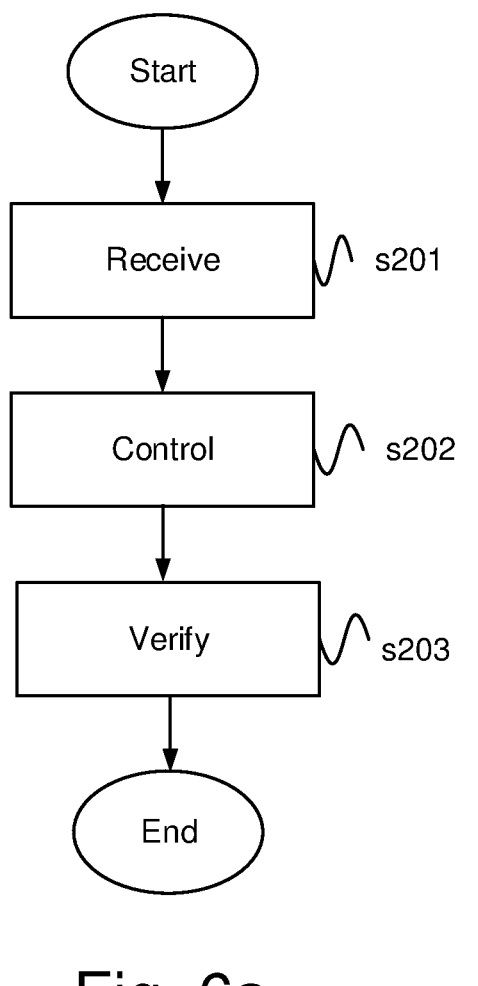
FIG. 6a-c illustrates flow charts for a method performed by a second control device for controlling assembly of a vehicle according to an embodiment.

FIG. 6*a* illustrates a flow chart for a method performed by a second control 200 device for controlling assembly of a vehicle 1 from a set of modules 20 according to an embodiment. The method thus relates to the second control device 200 as disclosed in FIG. 2 and the set of modules 20 as disclosed in FIG. 4. The set of modules 20 thus comprises at least one drive module 30 and at least one functional module 40. The method comprises receiving s201 a command to physically connect the at least one drive module 30 with the at least one functional module 40 to assemble a vehicle 1; controlling s202 the at least one drive module 30 to physically connect with the at least one functional module 40; and verifying s203 the connection between the modules 30; 40. The at least one drive module 30 is thereby autonomously operated to connect with the at least one functional module 40 and a vehicle 1 is assembled.

Controlling s202 the at least one drive module 30 to physically connect with the at least one functional module 40 may comprise controlling the propulsion and the steering of the drive module 30, such that the drive module 30 is moved to the functional module 40 to connect with. Controlling s202 the at least one drive module 30 to physically connect with the at least one functional module 40 may also comprise identifying the location of the functional module 40 to connect with. Controlling s202 the at least one drive module 30 to physically connect with the at least one functional module 40 may further comprise controlling the physical interface 50 of the drive module 30, such that it connects with the corresponding physical interface 50 of the functional module 40.

Figure 6B:
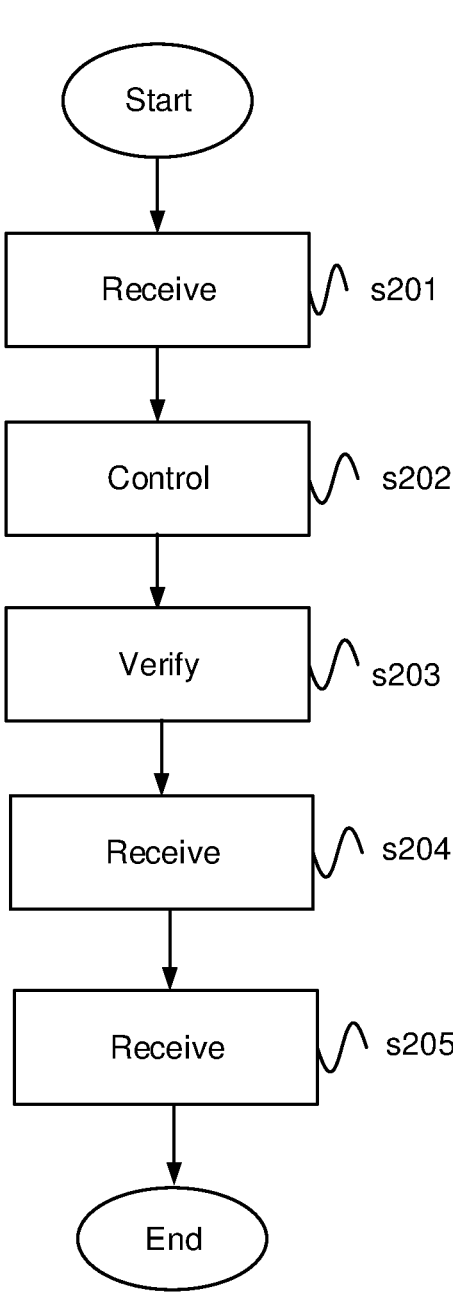

FIG. 6b illustrates a flow chart for a method performed by a second control device 200 for controlling assembly of a vehicle 1 from a set of modules 20 according to an embodiment. The method thus relates to the second control device 200 as disclosed in FIG. 2 and the set of modules 20 as disclosed in FIG. 4. The set of modules 20 thus comprises at least one drive module 30 and at least one functional module 40. The method comprises receiving s201 a command to physically connect the at least one drive module 30 with the at least one functional module 40 to assemble a vehicle 1; controlling s202 the at least one drive module 30 to physically connect with the at least one functional module 40. The command may also comprise to electrically connect the at least one drive module 30 with the at least one functional module 40. The step of controlling s202 the at least one drive module 30 to physically connect with the at least one functional module 40 may thereby also comprise controlling s202 the at least one drive module 30 to electrically connect with the at least one functional module 40. Controlling s202 the drive module 30 to electrically connect with the at least one functional module 40 may comprise controlling a switch, a contactor or similar. Controlling s202 the drive module 30 to electrically connect with the at least one functional module 40 may additionally or alternatively comprise inserting a plug into a socket. Once the electrical connection has been performed, energy transfer and/or communication between the modules 30, 40 is enabled.

The method may further comprise verifying s203 the connection between the modules 30, 40. The method may comprise verifying s203 the physical and/or the electrical connection between the modules 30, 40. The second control device 200 may verify s203 the connection between the modules 30, 40 based on a signal from a sensor device 60 sensing when the connection has been performed. The second control device 200 suitably verifies s203 the connection between the modules 30, 40 to the first control device 100.

The method may further comprise receiving s204, from the first control device 100, a unique vehicle identity.

The method may also comprise receiving s205, from the first control device 100, a configuration for the at least one drive module 30, wherein the configuration is determined based on a function to be performed by the assembled vehicle 1.

Figure 6C:
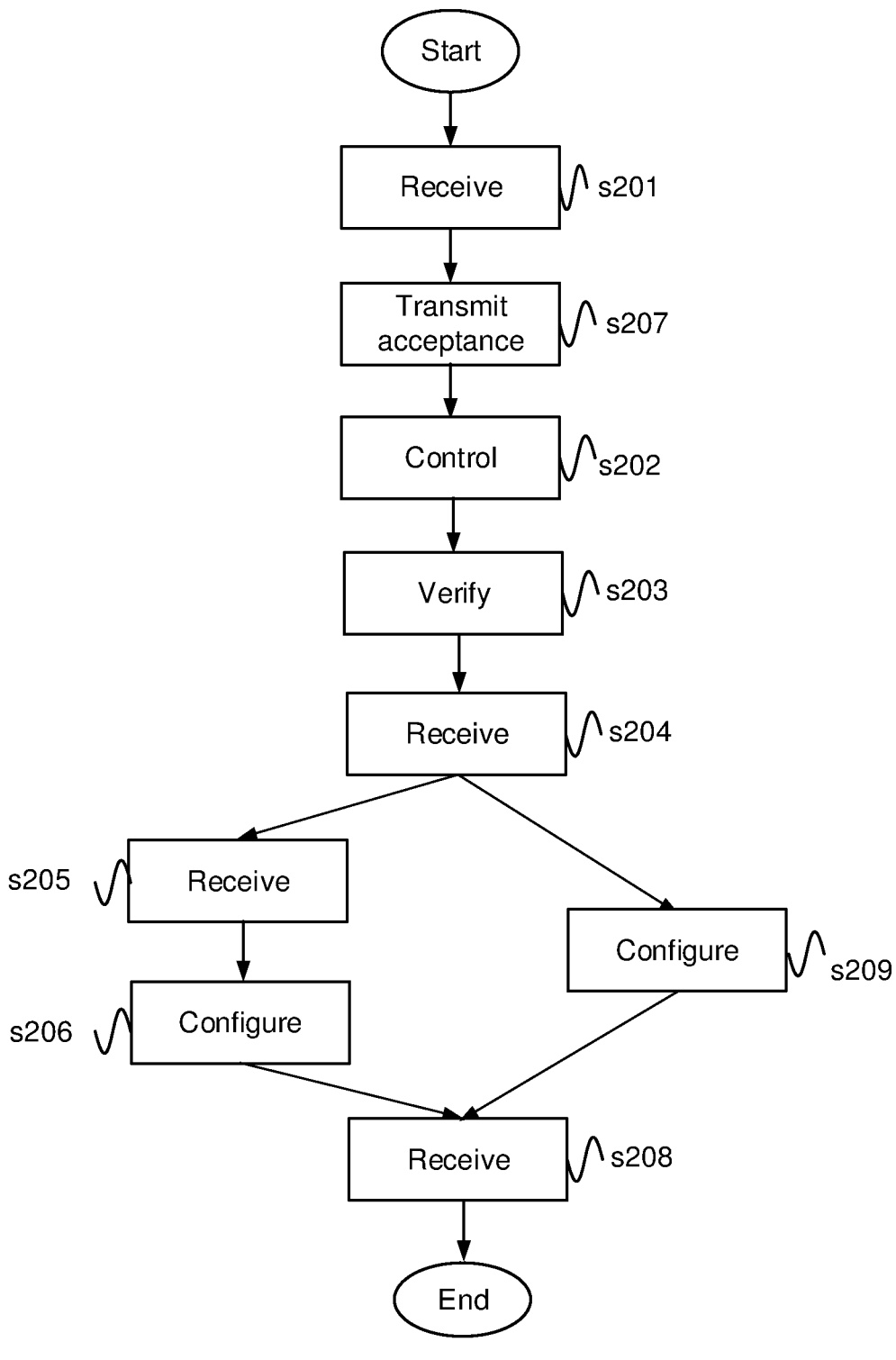

FIG. 6c illustrates a flow chart for a method performed by a second control device 200 for controlling assembly of a vehicle 1 from a set of modules 20 according to an embodiment. The method thus relates to the second control device 200 as disclosed in FIG. 2 and the set of modules 20 as disclosed in FIG. 4. The set of modules 20 thus comprises at least one drive module 30 and at least one functional module 40.

The method comprises receiving s201 a command to physically connect the at least one drive module 30 with the at least one functional module 40 to assemble a vehicle 1. The command may also comprise to electrically connect the at least one drive module 30 with the at least one functional module 40.

The method according to this example also comprises transmitting s207, to the first control device 100, an acceptance of the command to physically and/or electrically connect the at least one drive module 30 with the at least one functional module 40.

The method further comprises controlling s202 the at least one drive module 30 to physically connect with the at least one functional module 40. Controlling s202 the at least one drive module 30 to physically connect with the at least one functional module 40 may comprise controlling the propulsion and the steering of the drive module 30, such that the drive module 30 is moved to the functional module 40 to connect with. Controlling s202 the at least one drive module 30 to physically connect with the at least one functional module 40 may also comprise identifying the location of the functional module 40 to connect with. Controlling s202 the at least one drive module 30 to physically connect with the at least one functional module 40 may further comprise controlling the physical interface 50 of the drive module 30, such that it connects with the corresponding physical interface 50 of the functional module 40.

The step of controlling s202 the at least one drive module 30 to physically connect with the at least one functional module 40 may also comprise controlling s202 the at least one drive module 30 to electrically connect with the at least one functional module 40. Controlling s202 the drive module 30 to electrically connect with the at least one functional module 40 may comprise controlling a switch, a contactor or similar. Controlling s202 the drive module 30 to electrically connect with the at least one functional module 40 may additionally or alternatively comprise inserting a plug into a socket. Once the electrical connection has been performed, energy transfer and/or communication between the modules 30, 40 is enabled.

The method may further comprise verifying s203 the connection between the modules 30, 40. The method may comprise verifying s203 the physical and/or the electrical connection between the modules 30, 40. The second control device 200 may verify s203 the connection between the modules 30, 40 based on a signal from a sensor device 60 sensing when the connection has been performed. The second control device 200 suitably verifies s203 the connection between the modules 30, 40 to the first control device 100.

The method may further comprise receiving s204, from the first control device 100, a unique vehicle identity.

The method may also comprise receiving s205, from the first control device 100, a configuration for the at least one drive module 30, wherein the configuration is determined based on a function to be performed by the assembled vehicle 1; and configuring s206 the at least one drive module 30 according to the received configuration. The determined configuration may be defined by configuration parameters associated with characteristics of the drive module 30 including at least one of suspension, braking, steering and power outtake. The second control device 200 may thus receive instructions to configure the drive module 30 regarding suspension characteristics, brake settings, steering ratio etc. The configuration instructions are suitably received when the drive module 30 is connected with the functional module 40 and the vehicle 1 is assembled. The drive module 30 may also be dynamically configured based on the surroundings in which the vehicle 1 will perform its function. The configuration instructions may also be based on the functional module 40 connected with the drive module 30.

Alternatively, the method comprises configuring s209 the at least one drive module 30 according to at least one stored configuration, wherein the at least one stored configuration is based on a function to be performed by the assembled vehicle 1. The at least one configuration may be stored in the second control device 200 or in a separate memory connected to the second control device 200. Thus, when the at least one drive module 30 is connected with the at least one functional module 40, the second control device 200 knows which type of assembled vehicle 1 the drive module 30 is part of and the stored configuration associated with such assembled vehicle 1 is used to configure the at least one drive module 30. The at least one configuration for the at least one drive module 30 may alternatively be stored in the third control device of the functional module 40. Thus, the step of configuring s209 the at least one drive module 30 according to at least one stored configuration may also comprise receiving, from the functional module 40, a stored configuration for the at least one drive module 30, wherein the stored configuration is based on a function to be performed by the assembled vehicle 1.

The method also comprises receiving s208, from the first control device 100, a command to perform a mission/function.

Figure 7:
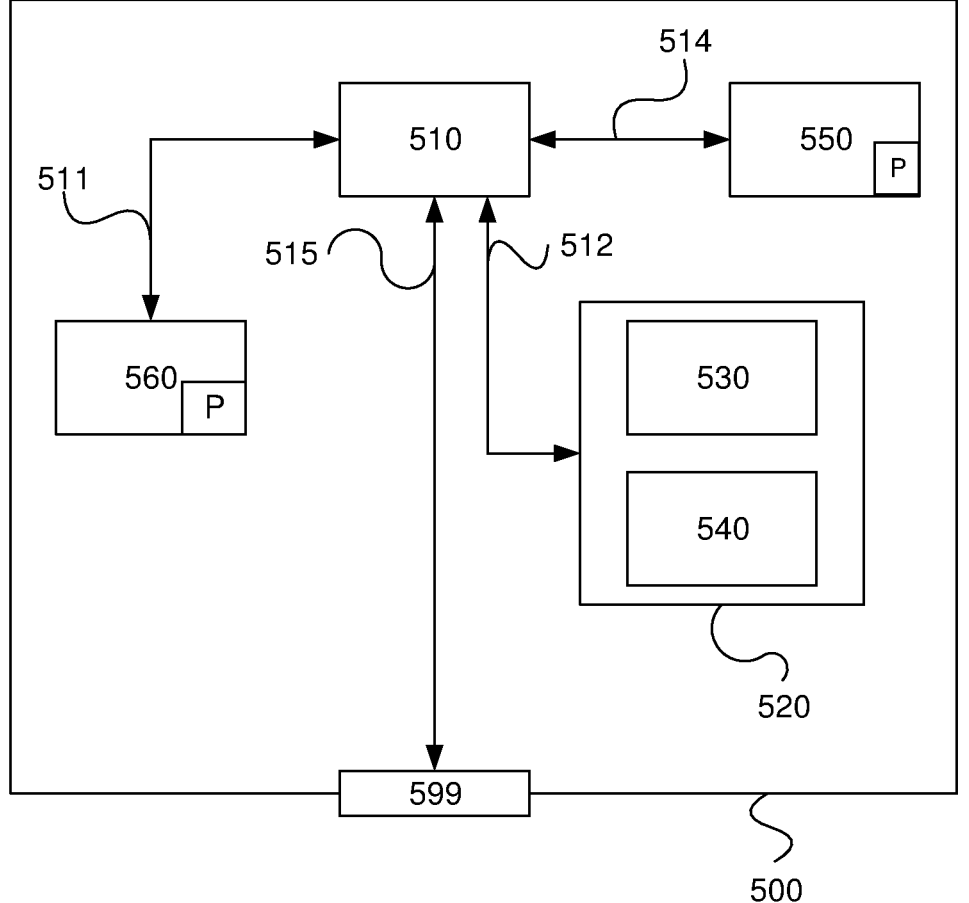
FIG. 7 schematically illustrates a control device or computer according to an embodiment.

FIG. 7 is a diagram of a version of a device 500. The first control device 100 and/or the second control device 200 described with reference to FIG. 1 and FIG. 2 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for controlling assembly of a vehicle from a set of modules. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540.

When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method performed by a first control device, where the first control device is part of a system configured for remotely controlling assembly of a vehicle from a remotely located set of modules, the set of remotely located modules comprising: at least one drive module and at least one functional module, wherein the at least one drive module comprises a propulsion unit and steering system connected to a pair of wheels and is configured to be autonomously operated by a second control device comprised in the at least one drive module, and wherein each module of the set of modules comprises at least one interface releasably connectable to a corresponding interface on the other module of the set of modules, where the first control device is located remote from the set of modules, the method comprising:

sending commands remotely from the first control device to the second control device located in the at least one drive module commanding the at least one drive module to connect with the at least one functional module in a vehicle self-assembly process, wherein upon receipt of such command by the second control device, the second control device located in the at least one drive module controls the propulsion unit and steering system of the drive module to autonomously move the drive module to and to physically connect with the at least one functional module by autonomous operation of the at least one drive module to thereby self-assemble a vehicle; and receiving remotely at the first control device, from at least one of the modules of the set of modules, a verification of the connection between the modules into an assembled vehicle.

2. The method according to claim 1, further comprising: selecting the at least one functional module to be connected with the at least one drive module based on a function to be performed by the assembled vehicle.

3. The method according to claim 1, wherein commanding the second control device of the at least one drive module to physically connect with the at least one functional module also comprises commanding the second control device of the at least one drive module to electrically connect with the at least one functional module.

4. The method according to claim 1, further comprising: generating a unique identity for the assembled vehicle.

5. The method according to claim 1, further comprising: determining a configuration for the at least one drive module based on a function to be performed by the assembled vehicle; and transmitting the determined configuration to the second control device.

6. The method according to claim 5, wherein the configuration is defined by configuration parameters associated with characteristics of the drive module, including at least one of: suspension, steering, braking and/or power outtake.

7. The method according to claim 1, further comprising: sending a command remotely from the first control device to the assembled vehicle to perform a certain mission or function after the first control device receives verification that the functional module and the drive module are connected.

8. The method according to claim 1, wherein sending commands to a second control device of the at least one drive module remotely from the first control device commanding the at least one drive module to connect with the at least one functional module in a vehicle assembly process, further comprises:

sending commands to the functional module to coordinate assembly with the drive module to assemble to each other.

9. The method according to claim 1, where the first control device is configured for controlling assembly of a plurality of vehicles from a plurality of drive and functional modules, wherein said method further comprising:

receiving a plurality of requested functions or missions to be performed by the vehicle once assembled at the first control device;

prioritizing vehicles to be assembled from the plurality of drive modules and functional modules based on the requested functions or missions; and sending commands from the first control device to the drive modules and/or the functional modules to assemble to each other respectively to form the plurality of vehicles in order of priority.

10. The method according to claim 1, where the first control device is configured for controlling assembly of a plurality of vehicles from a plurality of drive and functional modules, wherein said method further comprising:

receiving and storing remotely at the first control device information about a state of charge of an energy storage unit of for each of the plurality of drive and functional modules;

selecting particular ones of the drive and functional modules based on the status of the state of charge of the energy storage unit for each drive and functional module; and sending commands from the first control device to the selected drive module and/or the selected functional module to assemble to each other to form an assembled vehicle.

11. A computer program product comprising computer program code stored on a non-transitory computer-readable medium, said computer program product used by a first control device which is part of a system for remotely controlling assembly of a vehicle from a remotely located set of modules, the set of remotely located modules comprising: at least one drive module and at least one functional module, wherein the at least one drive module comprises a propulsion unit and steering system connected to a pair of wheels and is configured to be autonomously operated by a second control device comprised in the at least one drive module, and wherein each module of the set of modules comprises at least one interface releasably connectable to a corresponding interface on the other module of the set of modules, where the first control device is located remote from the set of modules, wherein said computer program code comprising computer instructions to cause the first control device to perform the following operations:

sending commands remotely from the first control device to the second control device located in the at least one drive module commanding the at least one drive module to connect with the at least one functional module in a vehicle self-assembly process, wherein upon receipt of such command by the second control device, the second control device located in the at least one drive module controls the propulsion unit and steering system of the drive module to autonomously move the drive module to and to physically connect with the at least one functional module by autonomous operation of the at least one drive module to thereby self-assemble a vehicle; and receiving remotely at the first control device, from at least one of the modules of the set of modules, a verification of the connection between the modules.

12. A first control device for controlling assembly of a vehicle from a remotely located set of modules, the set of remotely located modules comprising: at least one drive module and at least one functional module, wherein the at least one drive module comprises a propulsion unit and steering system connected to a pair of wheels and is configured to be autonomously operated by a second control device comprised in the at least one drive module, and wherein each module of the set of modules comprises at least one interface releasably connectable to a corresponding interface on the other module of the set of modules, where the first control device is part of a system located remote from the set of modules for remotely controlling assembly of the vehicle, the first control device being configured to:

send commands remotely from the first control device to the second control device located in the at least one drive module commanding the at least one drive module to connect with the at least one functional module in a vehicle self-assembly process, wherein upon receipt of such command by the second control device, the second control device located in the at least one drive module controls the propulsion unit and steering system of the drive module to autonomously move the drive module to and to physically connect with the at least one functional module by autonomous operation of the at least one drive module to thereby self-assemble a vehicle; and receive remotely at the first control device, from at least one of the modules of the set of modules, a verification of the connection between the modules into an assembled vehicle.

13. The first control device according to claim 12, wherein the first control device is configured to determine a configuration for the at least one drive module based on a function to be performed by the assembled vehicle, and to transmit the determined configuration to the second control device.

* * * * *